US010114326B2

(12) United States Patent
Yamashita

(10) Patent No.: US 10,114,326 B2
(45) Date of Patent: Oct. 30, 2018

(54) IMAGE FORMING APPARATUS HAVING PAPER DEVIATION COMPENSATION FUNCTION FOR COMPENSATING DEVIATION OF PAPER BASED ON IMAGE AREA DETERMINED ACCORDING TO IMAGE DATA FOR GIVEN PAGE OF A JOB AND IMAGE FORMABLE AREA OF IMAGE FORMING UNIT, AND IMAGE FORMING METHOD FOR SAME

(71) Applicant: Takashi Yamashita, Tokyo (JP)

(72) Inventor: Takashi Yamashita, Tokyo (JP)

(73) Assignee: KONICA MINOLTA BUSINESS TECHNOLOGIES, INC., Tokyo (JP)

( * ) Notice: Subject to any disclaimer, the term of this patent is extended or adjusted under 35 U.S.C. 154(b) by 288 days.

(21) Appl. No.: 13/660,105

(22) Filed: Oct. 25, 2012

(65) Prior Publication Data

US 2013/0114096 A1 May 9, 2013

(30) Foreign Application Priority Data

Nov. 4, 2011 (JP) ................................ 2011-242875

(51) Int. Cl.
*G06K 15/02* (2006.01)
*G03G 15/00* (2006.01)

(52) U.S. Cl.
CPC ..... *G03G 15/6567* (2013.01); *G03G 15/6594* (2013.01)

(58) Field of Classification Search
None
See application file for complete search history.

(56) References Cited

U.S. PATENT DOCUMENTS 7,880,871 B2 2/2011 Kazama et al.
2007/0070451 A1* 3/2007 Kazama ............ H04N 1/00681 358/498

(Continued)

FOREIGN PATENT DOCUMENTS

JP 03-094275 A 4/1991
JP 2003-081489 A 3/2003

(Continued)

OTHER PUBLICATIONS

Japanese Office Action dated Oct. 9, 2013 (and English translation thereof) in counterpart Japanese Application No. 2011-242875.

(Continued)

*Primary Examiner* — Chad Dickerson
*Assistant Examiner* — Pawandeep Dhingra
(74) *Attorney, Agent, or Firm* — Holtz, Holtz & Volek PC

(57) ABSTRACT

Image forming apparatus includes an image forming unit, a paper transport unit, a paper position measuring unit, a deviation compensating unit in preparation to image forming, a control unit for controlling the image formation and the deviation compensation, wherein the control unit includes a function that receives the results measured by the paper position measuring unit and compensates the deviation of the paper in accordance with the measured results, wherein, the control unit shifts the paper toward a predetermined position in the direction across the paper transporting direction and shift the image forming position in the main scanning direction in accordance with the predetermined position of the paper, wherein, the control unit decides the predetermined position so that the image area based on the image forming position being shifted does not go out of the range of the image formable area.

12 Claims, 12 Drawing Sheets

(56) References Cited

U.S. PATENT DOCUMENTS

| | | | | |
|---|---|---|---|---|
| 2008/0024808 | A1* | 1/2008 | Masuda | G03G 15/6567 358/1.12 |
| 2008/0158606 | A1* | 7/2008 | Matsuzaki | G06K 15/02 358/1.18 |
| 2009/0256308 | A1* | 10/2009 | Kazama | B65H 7/02 271/226 |

FOREIGN PATENT DOCUMENTS

| | | | | |
|---|---|---|---|---|
| JP | 2005-335270 | A | | 12/2005 |
| JP | 2006084796 | A | * | 3/2006 |
| JP | 2006-347644 | A | | 12/2006 |
| JP | 2008-032913 | A | | 2/2008 |
| JP | 2009-256003 | A | | 11/2009 |
| JP | 2010-089868 | A | | 4/2010 |
| JP | 2010-215374 | A | | 9/2010 |

OTHER PUBLICATIONS

Japanese Office Action dated Jan. 29, 2014 (and English translation thereof) in counterpart Japanese Application No. 2011-242875.

Chinese Office Action (and English translation thereof) dated Sep. 6, 2015, issued in counterpart Chinese Application No. 201210431098.7.

Japanese Office Action dated Jun. 4, 2014 issued in counterpart Japanese Application No. 2011-242875.

* cited by examiner

IMAGE FORMING APPARATUS HAVING PAPER DEVIATION COMPENSATION FUNCTION FOR COMPENSATING DEVIATION OF PAPER BASED ON IMAGE AREA DETERMINED ACCORDING TO IMAGE DATA FOR GIVEN PAGE OF A JOB AND IMAGE FORMABLE AREA OF IMAGE FORMING UNIT, AND IMAGE FORMING METHOD FOR SAME

BACKGROUND OF INVENTION

Field of the Invention

The present invention relates to an image forming apparatus for forming images onto papers. More particularly, the present invention provides the image forming apparatus and method that allow any deviation of the paper that may occur in the direction across the paper transporting direction to be compensated in preparation to the images forming.

Description of the Prior Art

In the image forming apparatus of the electronic photocopying type such as a copying machine, a printer machine, a facsimile machine, and a multi function machine that provides the functions of the aforementioned machines, an image forming unit is provided, in which a latent image corresponding to the image on the original document is formed onto the photosensitive element, this latent image is developed into an developed image by applying a toner onto the latent image, and the resulting toner image is finally transferred onto the paper. Following this, the toner image on the paper is fixed in the fixing unit and is outputted from the machine.

The papers mentioned above are usually placed on the paper feeding tray. When an image is to be formed, the papers on the tray are fed by the paper transporting unit to the image forming unit. For the paper having the image formed on the front side thereof, it is reversed to the rear side as required and then transported by the reversing and transporting unit. The reversed paper is then transported back to the paper transporting unit where the image is formed on the rear side of the paper.

When papers are to be supplied on the paper feeding tray, the paper guide plate may not be held firmly in the direction across the paper transporting direction or the paper guide plate itself may have the mechanical problem in that it is loosened permanently. If the papers are not held securely on the tray as described above, those papers may be incorrectly aligned in the direction across the paper transporting direction and then a deviation may occur when they are to be fed from the tray in the apparatus. This deviation may also occur due to the vibrations or the poor quality of any associated parts caused by the aging while the papers are being transported.

It may be apparent from the above description that the deviation can be compensated by the front side resist unit, and there are the two main types of the deviation, that is, the one that may be caused when the papers are to be fed and the one that may be caused while the papers are being transported.

For the deviation described above, the deviation compensating mechanism is proposed, in which such deviation can be compensated by shifting the paper being transported toward the direction across the paper transporting direction (ref. Patent Document 1, for example). In the deviation compensating mechanism proposed by Patent Document 1, the deviation compensating unit is allowed to be waiting on the point different from the original point before the deviation compensation, and it can then compensate the deviation. The restriction on the quantity by which the paper is to be shifted is reduced accordingly.

In the patent Document 2, the deviation is allowed to be compensated precisely by deciding the position of the output image in accordance with the deviation compensation of the paper.

In the patent Document 3, the invention related to the deviation compensation that allows the deviation to be compensated precisely is disclosed.

In the patent Document 4, the deviation of the paper across the width thereof is allowed to be compensated by shifting the deviated paper across the width thereof, wherein when the large-size papers are fluctuated, the load upon the driving motor will be increased, and so the paper feeding will be stopped in the paper fluctuating position where the paper will be shifted across the width thereof and will then be transported again.

The following is a list of the prior Patent Documents associated with the present invention:

Patent Document 1: Patent application laid open No. 2010-215374

Patent Document 2: Patent application laid open No. 2008-32913

Patent Document 3: Patent application laid open No. 2003-081489

Patent Document 4: Patent application laid open No. Heise3-094275

SUMMARY OF THE INVENTION

In the conventional apparatus that compensates a deviation of the paper by fluctuating the resist rollers, it is usual that for the small-size papers, for example, the paper can be fitted within the range of the image formable area in the image forming unit even though the paper is shifted by the maximum correctable quantity within which the deviation can be fluctuated. When the paper size becomes larger, however, the distance from the end of the paper to the end of the range of the image formable area may be smaller than the maximum fluctuating distance. In such cases, it may be possible that the paper goes out of the range of the image formable area and the paper is printed with some parts of the image being lost, when the particular reference position for the paper is set and the paper is so fluctuated as to meet the particular reference position and the position in which the image will be formed is then made to meet the paper position after the fluctuation. This may reduce the quality of the final product The present invention has been made under the background described above, and it is one object of the present invention to provide the image forming apparatus and method that allow any deviations to be compensated without causing the loss of any part of the image that may occur when such deviations are compensated.

To achieve at least one of the above mentioned objects, the image forming apparatus reflecting one aspect of the present invention includes an image forming unit for forming an image onto a paper;

a paper transport unit for transporting the paper;

a paper position measuring unit for measuring the position of the paper being transported in the direction across the paper transporting direction;

a deviation compensating unit for compensating a deviation of the paper by shifting the paper, which is being transported, toward the direction across the paper transporting direction in preparation to image forming;

a control unit for controlling the image formation and the deviation compensation, wherein the control unit includes a function that receives the results as measured by the paper position measuring unit and shifts the paper toward a predetermined position in the direction across the paper transporting direction and shifts the image forming position in the image forming in the main scanning direction in accordance with the predetermined position of the paper in the deviation compensation in accordance with the measured results, wherein, in the function, the control unit decides the predetermined position so that the image area based on the image forming position being shifted does not go out of the range of the image formable area in the image forming unit.

In the above-described image forming apparatus, it is preferred that a reference position for a paper that provides the basis for the predetermined position has previously been set, and wherein in performing the function, the control unit decides the predetermined position that is different from the reference position, in a case where it is determined that the image area goes out of the range of the image formable area when the image forming position is shifted toward the reference position as the predetermined position.

In the above-described image forming apparatus, it is preferred that the reference position is provided by a machine setting.

In the above-described image forming apparatus, it is preferred that the control unit computes the reference position by taking an average of individual deviated quantities for each of a predetermined number of sheets of the paper that are obtained as measured by the paper position measuring unit.

In the above-described image forming apparatus, it is preferred that in performing the function, the control unit decides the reference position as the predetermined position, in a case where it is determined that the image area based on the image forming position does not go out of the range of the image formable area even though the image forming position is shifted toward the reference position as the predetermined position.

In the above-described image forming apparatus, it is preferred that in performing the function, the control unit decides the predetermined position so that the end of paper in the direction across the paper transporting direction is placed on the end of the range of the image formable area, in a case where it is determined that the image area based on the image forming position goes out of the range of the image formable area when the image forming position is shifted toward the reference position as the predetermined position.

In the above-described image forming apparatus, it is preferred that in performing the function, the control unit decides the predetermined position so that the end of the image area in the main scanning direction is located on the end of the range of the image formable area in the main scanning direction, in a case where it is determined that the image area based on the image forming position goes out of the range of the image formable area when the image forming position is shifted toward the reference position as the predetermined position.

In the above-described image forming apparatus, it is preferred that the control unit determines, on the basis of the image data for each page of the paper being printed, whether or not the image area goes out of the range of the image formable area.

In the above-described image forming apparatus, it is preferred that the control unit determines, on the basis of the image data for several pages of the paper being printed, whether or not the image area goes out of the range of the image formable area.

In the above-described image forming apparatus, it is preferred that the control unit makes the determination on the basis of the image data for any one of the a plurality of pages of papers in which the image area is located on the outermost side in the main scanning direction.

To achieve at least one of the above mentioned objects, the image forming method reflecting one aspect of the present invention comprises a steps of;

in a preparation for the image formation, measuring the position in the direction across the paper transporting direction of a paper being transported;

shifting the paper, which is being transported, toward a predetermined position in the direction across the paper transporting direction and thereby compensating any deviation of the paper, and shifting the image forming position for the image forming in the main scanning direction on the basis of the predetermined position of the paper, in accordance with the results obtained by the measuring; and determining the predetermined position so that the image area based on the image forming position after the step of shifting the image forming position is performed does not go out of the range of the image formable area in an image forming unit.

In the above-described image forming apparatus, it is preferred that the image forming apparatus further includes the step of setting a reference position for the paper that serves as the predetermined position and the step of deciding the predetermined position that is different from the reference position, in a case where it is determined that the image area goes out of the range of the image formable area when the image forming position is shifted toward the reference position as the predetermined position.

In the above-described image forming apparatus, it is preferred that the reference position is provided by a machine setting.

In the above-described image forming apparatus, it is preferred that the image forming apparatus further includes the step of averaging the deviation quantities for several pages of the paper as measured by the step of measuring the paper position and thereby computing the reference position.

In the above-described image forming apparatus, it is preferred that the image forming apparatus further includes the step of deciding the reference position as the predetermined position in a case where it is determined that the image area based on the image forming position goes out of the range of the image formable area even though the image forming position is shifted toward the reference position as the predetermined position.

In the above-described image forming apparatus, it is preferred that the image forming apparatus further includes the step of deciding the predetermined position so that the end of the paper in the direction across the paper transporting direction of the paper is located on the end of the range of the image formable area, in a case where it is determined that the image area based on the image forming position goes out of the range of the image formable area when the image forming position is shifted toward the reference position as the predetermined position.

In the above-described image forming apparatus, it is preferred that the image forming apparatus further includes the step of deciding the predetermined position so that the end of the image area in the main scanning direction can be located on the end of the range of the image formable area in the main scanning direction, in a case where it is determined that the image area based on the image forming position goes out of the range of the image formable area when the image forming position is shifted toward the reference position as the predetermined position.

In the above-described image forming apparatus, it is preferred that the image forming apparatus further includes the step of determining, on the basis of the image data for each page of the paper being printed, whether or not the image area goes out of the range of the image formable area.

In the above-described image forming apparatus, it is preferred that the image forming apparatus further includes the step of determining, on the basis of the image data for several pages of the paper being printed, whether or not the image area goes out of the range of the image formable area.

In the above-described image forming apparatus, it is preferred that the determination is made on the basis of the image data for any one of the plurality of pages of the papers in which the image data is located on the outermost side in the main scanning direction.

DETAILED DESCRIPTION OF THE INVENTION

One embodiment of the present invention is described below.

Figure 1:
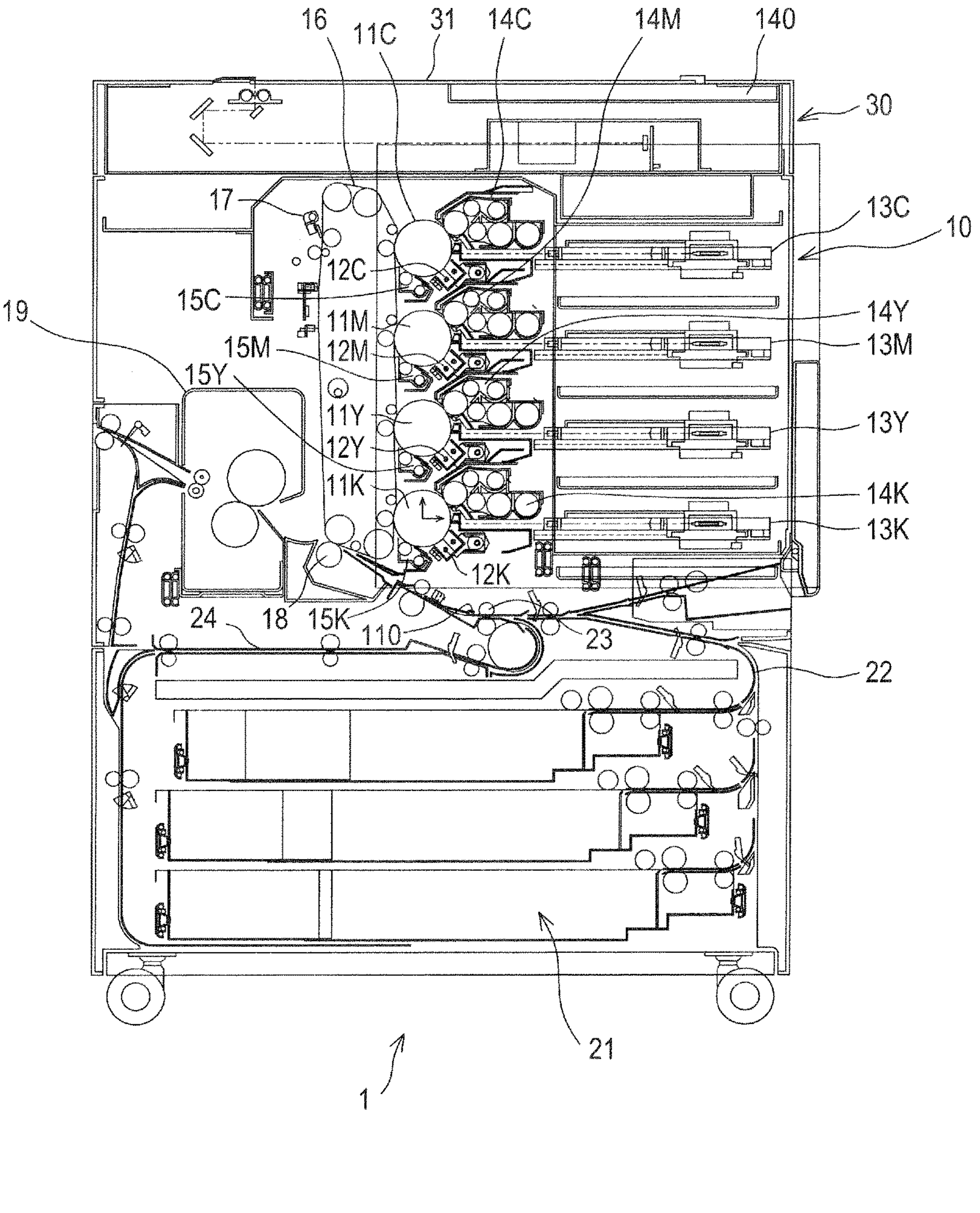
FIG. 1 is a schematic cross-sectional view illustrating the mechanical construction of the image forming apparatus in accordance with one embodiment of the present invention.

In FIG. 1, reference numeral 10 refers to an image forming unit and reference numeral 30 refers to a scanner unit.

In the scanner unit 30, images on an original document where are transported by an automatic original document transport device (not shown in FIG. 1) or on an original document where are placed on the platen 31 are read, and stored in the image memory or any other storage device (not shown).

The image forming unit 10 includes photosensitive elements 11C, 11M, 11Y, 11K (which may be referred to collectively as the photosensitive element 11), each being provided for each of the colors (cyan, magenta, yellow, black and the like). Electrical chargers 12C, 12M, 12Y, 12K (which may be referred to collectively as the electrical charger 12), writing units 13C, 13M, 13Y, 13K (which may be referred to collectively as the writing unit 13), and developer units 14C, 14M, 14Y, 14K (which may be referred to collectively as the developer unit 14) are provided around each of the photosensitive elements 11C, 11M, 11Y, 11K, wherein the surface of the photosensitive element 11 electrically charged by the electrical charger 12 has an image exposed by the writing unit 13 in accordance with the image information on the original document and which has been stored on the image memory or the like storage device so that an latent image can be formed on the surface of the photosensitive element 11. This latent image is developed by the developer units 14 into a toner image. This toner image is transferred onto an intermediate transfer belt 16, from which the toner image is then transferred to a paper being transported along the paper transport path 22 by a secondary transfer roller 18. The paper on which the image has been transferred is then heated and fixed by a fixer device 19, from which the paper is outputted (printed) to a paper outputting portion as the image formed output. The paper transport path 22 forms an integral part of the paper transport unit of the present invention.

In the paper transport path 22, a pair of resist rollers 23 disposed which can compensate any inclination of the paper by hitting the paper against the resist rollers 23, and a paper position sensor 110 provided immediately after the downstream side of the resist rollers 23 so that the paper position sensor 110 can detect the forward end of the paper. The resist rollers 23, which have being held the paper therebetween, may be fluctuated by the drive motor (not shown) so that any deviation of the paper can be compensated by shifting the paper toward the direction across the paper transporting direction, or in this example, toward the orthogonal direction across the paper transporting direction. The resist rollers 23 form an integral part of the deviation compensating unit of the present invention. The paper position sensor 110 is corresponded to the paper position measuring unit of the present invention.

In addition, the image forming unit 10 includes cleaning units 15C, 15M, 15Y, 15K each of which corresponds to each of the photosensitive elements 11C, 11M, 11Y, 11K and remove any remaining toner by making contact with each of the photosensitive elements 11C, 11M, 11Y, 11K on the side of the rotating direction from the contact position with the intermediate transfer belt 16 and on the opposite side of the rotating direction from the electrical chargers 12C, 12M, 12Y, 12K. A further cleaning unit 17 is provided on the side of the rotating direction from the paper transfer position of the intermediate transfer belt 16 and on the opposite side of the rotation direction from the transfer position with each photosensitive element so that it can remove any remaining toner on the intermediate transfer belt 16.

It is noted that each photosensitive element 11 are driven and rotated by the drive motor (not shown), and the intermediate transfer belt 16 is also driven and rotated by the drive motor (not shown).

Furthermore, the image forming apparatus 1 includes a plurality of paper feeding trays 21 for containing papers and which are disposed on the lower side of the image forming unit 10. There is also the paper transport path 22 that extends from each of the paper feeding trays 21 to the image forming unit 10 from which it extends to the paper output portion.

The paper transport path 22 is provided for feeding and transporting papers, and forms an integral part of the paper transport unit of the present invention. Papers that are placed on each of the paper feeding trays 21 are fed onto the paper transport path 22 on which the papers are transported through the resist rollers 23 to the secondary transfer roller 18. On the secondary transfer roller 18, a color image on the intermediate transfer belt 16 is transferred onto the paper. The paper on which the color image has been transferred is then heated and pressed in the fixing device 19 where the toner image is fixed. In the one-side mode and face-up mode, the paper is outputted from the apparatus.

The image forming apparatus 1 also includes a paper reversing and transporting path 24. The paper that has been fixed may be led from the fixing device 19 toward the paper reversing and transporting path 24 where the paper is reversed to the rear side, and outputted in the face-down mode from the apparatus or the image may be formed onto both sides of the paper in the both-side mode. The paper reversing and transporting path 24 joins the paper transport path 22 on the upstream side of the resist rollers 23 so that the paper can be recycled.

Furthermore, the image forming apparatus 1 has an operation unit 140 on the top of its body, which allows various setting values to be entered and displayed.

Figure 2:
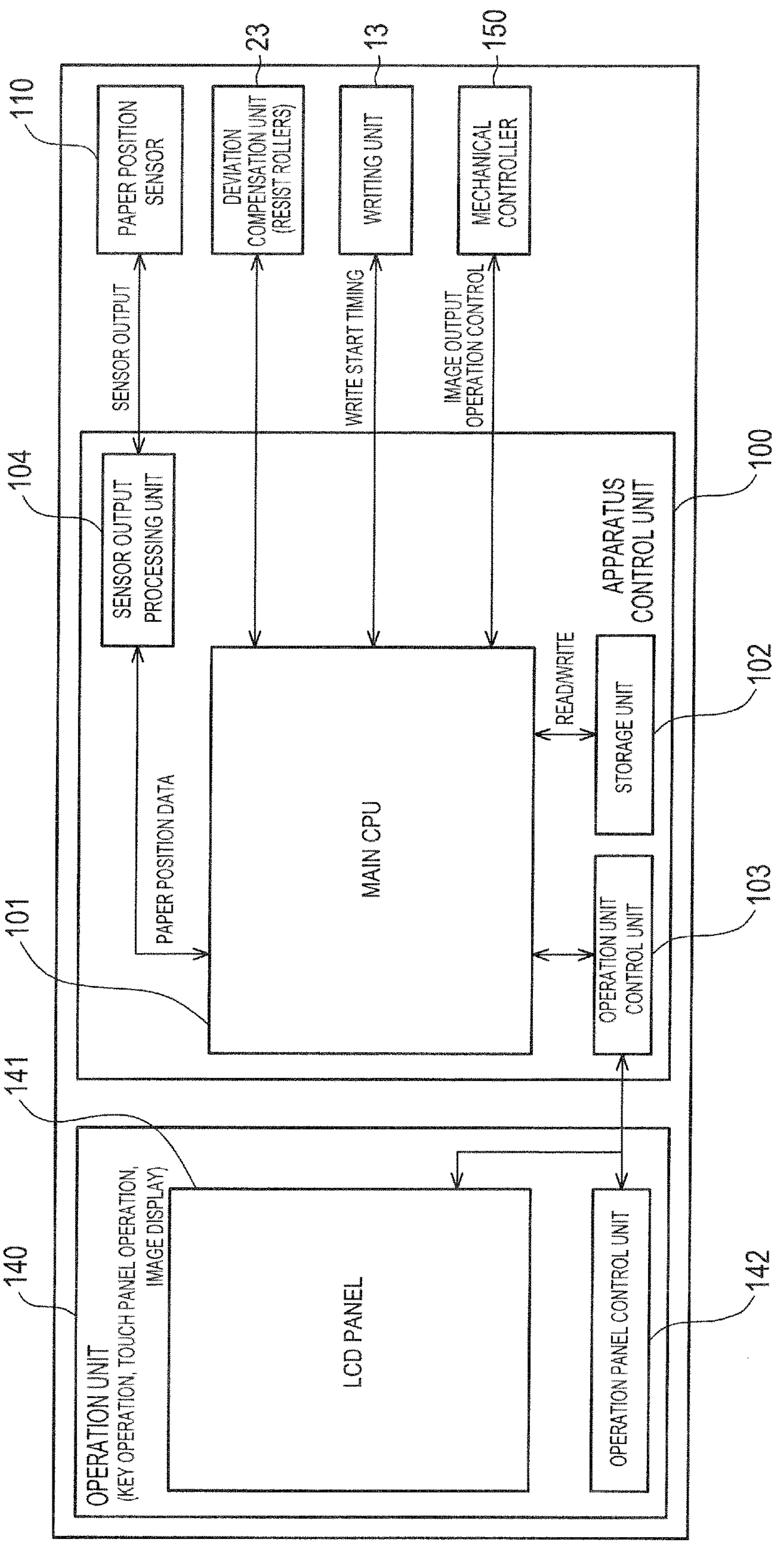
FIG. 2 is a diagram illustrating the control block for the image forming apparatus in accordance with one embodiment of the present invention.

Referring to FIG. 2, there is a block diagram that illustrates the electrical arrangement of the image forming apparatus of the present invention. An explanation concerning the blocks are described below.

The image forming apparatus 1 includes an apparatus control unit 100 for controlling the image forming apparatus as a whole. The image forming apparatus 1 further includes a main CPU 101 that executes various arithmetic, and a storage unit 102 that is coupled with the main CPU 101. The storage unit 102 may be implemented by a flash memory or HDD on which data may be stored as nonvolatile. The information relating to the papers (such as the types and sizes of the papers) that may be specified for each paper feeding tray, the range of the image formable area in the image forming unit, the reference position that is used in compensating the deviation of the paper and the like may be stored in the storage unit 102.

The apparatus control unit 100 described above is corresponded to the control unit of the present invention.

A control system (mechanical controller 150) for controlling the various mechanism (not shown) included in the image forming apparatus (such as the original document reading, the paper transporting, the image forming mechanism and the like) is coupled with the main CPU 101. So those mechanism are allowed to be controlled by the main CPU.

Figure 3:
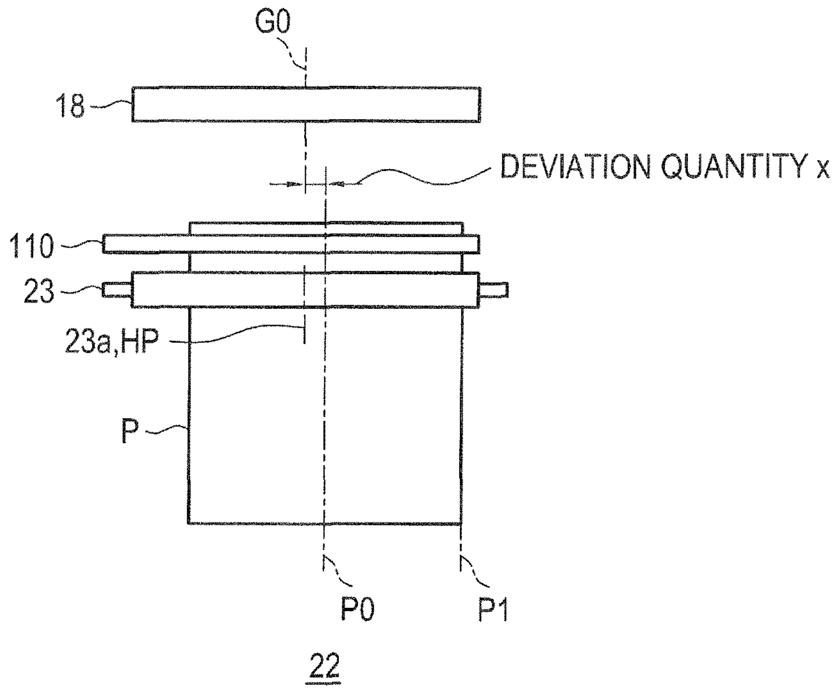
FIG. 3 shows the neighborhood of the paper position measuring unit and the deviation compensating unit in accordance with one embodiment of the present invention.

A paper position sensor 110 is connected to the apparatus control unit 100 through a sensor output processing unit 104 so that the paper position sensor 110 can be controlled by the main CPU 100. The paper position sensor 110 detects the paper position of a paper P passing through the resist rollers 23 as shown in FIG. 3. The paper position sensor 110 may be implemented by any reflection type or transmission type line sensor, and is disposed along the direction across the paper transporting direction of the paper P.

The results as detected by the paper position sensor 110 are sent to the sensor output processing unit 104 included in the apparatus control unit 100. The sensor output processing unit 104 may be implemented by CPU or the like, and provides the paper position data by processing and computing the sensor output data. This paper position data is sent to the main CPU. The main CPU can detect any deviation quantity of the paper from the paper position and the paper size.

The resist rollers 23 are located in the neighborhood of the upstream side of the image forming unit 10, and are provided for adjusting the forward end of the paper and making the timing for image forming when the paper P hits to the resist rollers 23.

As described above, the image forming apparatus includes the image forming unit 10 that is provided for writing an image onto any appropriate recording medium, wherein the image forming unit 10 includes the photosensitive element 11, the writing unit 13, the image developer unit 14, the intermediate transfer belt 16, the secondary transfer roller 18, the fixing device 19 and the like. A latent image is formed onto the photosensitive element 11 by the writing unit 13 having LD and the like. Then, the latent image is developed to a toner image by the toner of the developer unit 14, and the toner image is then formed onto the paper by the secondary transfer roller 18 through the intermediate transfer belt 16. After then, the image on the paper is fixed by the fixing device 19. The image forming unit 10 described above is controlled by the mechanical controller 150, and the writing unit 13 therein is connected to the main CPU 101 so that the writing unit 13 can be controlled by the main CPU 101.

The resist rollers 23, which are corresponded to the deviation compensating unit of the present invention, are connected to the main CPU 101, and make the compensation of any paper the paper (fluctuating action) in accordance with the deviation quantity as instructed by the main CPU 101. The main CPU 101 controls the resist rollers 23 to transport the paper and adjust the write start timing of the writing unit 13. The main CPU 101 also adjust s (shift) the image forming position when the deviation of the paper is compensated, and sends the image forming position and write start timing information to the writing unit 13. In response, the writing unit 13 writes the image onto the appropriate photosensitive element 11 as specified by the information related to the image forming position and write start timing.

The operation unit 140 is connected to the main CPU 101 through the operation control unit 103 included in the apparatus control unit 100. The operation unit 140 is corresponded to the operation unit of the present invention, and the operation panel control unit 142 included in the operation unit 140 is connected to the operation control unit 103. The operation unit 140 includes an LCD panel 141 which is controlled by the operation control unit 103 directly or through the operation panel control unit 142 so that various information can be displayed or entered. In this embodiment, however, the operation unit is shown as the operation unit 140 that allows for the display and operation, but in the present invention, the operation unit may be provided so that the display and the operation can be performed independently from each other.

Next, the fundamental operations of the image forming apparatus 1 and the image forming method are explained.

When an image is to be formed by the image forming apparatus 1, that is, by the image forming apparatus 1 that is used as the copying machine or printer, the image is written onto the photosensitive element 11 by the writing unit 13 using the image data stored in the not shown memory.

In the image forming unit 10, the toner image written on the photosensitive element 11 is transferred onto the intermediate transfer belt 16, and is then transferred onto one of the papers fed by the paper feeding tray 21 and is then fixed by the fixing device 19. The paper on which the image has been formed is outputted via the paper transport path 22.

On the photosensitive element 11, the toner image is transferred onto the intermediate transfer belt 16, and is then passed through the cleaning unit 15 in which any remaining toner is removed. On the intermediate transfer belt 16, the toner image is also transferred onto the paper, and is then passed through the cleaning unit 17 in which any remaining toner is removed.

Referring to FIG. 3, the mechanical arrangement in the neighborhood of the resist rollers 23 on the paper transport path 22 is described below.

On the paper transport path 22, there is a pair of resist rollers 23 that consists of the upper roller and the lower roller which are arranged opposite each other toward the front side of the paper transporting direction of the secondary transfer roller 18. On the resist rollers 23, the forward end of the paper P being transported along the paper transport path 22 hits against the resist rollers 23, forming a loop and thereby compensating any inclination of the running paper. After the loop has been formed by the resist rollers 23, the resist rollers 23 is driven for rotation in the paper transporting direction in accordance with the image on the intermediate transfer belt 16, and the paper P is transported toward the secondary transfer roller 18. On this moment, the end position of the paper P is read by the paper position sensor 110 immediately located on the downstream side of the resist rollers 23. The resist rollers 23 can shift (fluctuate) the paper P toward the main scanning direction (direction across the paper transporting direction) by holding the paper P therebetween. It may be appreciated, therefore, that the resist rollers, together with the drive motor and the like for fluctuating the resist rollers, form the deviation compensating unit of the present invention. The fluctuation of the resist rollers 23 is controlled by the apparatus control unit 100. It should be understood, however, that the present invention is not limited to the embodiment in which the deviation compensating unit is provided by the resist rollers 23.

As shown in FIG. 3, the resist rollers 23 have their center 23*a* located in the reference position HP which is aligned with the center position of the secondary transfer roller 18. The reference position HP previously have been set as the position where the paper should be located. The data of the reference position HP is stored in the storage unit 102 by a machine setting or set after the apparatus has been running. It should be noted, however, that the reference position HP may be set so that it is not be aligned with the center position of the secondary transfer roller 18.

FIG. 3 shows that the deviation with the quantity x occurs for the paper that has reached the resist rollers 23.

On the paper position sensor 110, the end of the paper P being transported in the paper transporting direction is measured, and the results as measured by the paper position sensor 110 is sent to the main CPU 101 through the sensor output processing unit 104. On the main CPU 101, the paper of the appropriate size is selected when the papers are fed, and the paper center P0 and the position of the paper end P1 is determined from the selected paper size and the results as measured by the paper position sensor 110. On the main CPU 101, the image forming position G0 in which the image formed on the intermediate transfer belt 16 is also set. On the main CPU 101, furthermore, the reference position HP in which the paper should be located as described above have been set. In this example, the image forming position G0 and the reference position HP are aligned with the center line of the intermediate transfer belt 16. On the main CPU 101, for example, the difference between the above paper center P0 and the reference position HP is determined. The difference as thus determined represents the deviation quantity x. On the main CPU 101, the paper center P0 and the reference position HP is aligned with each other by shifting the paper so that the deviation quantity x can be equal to 0 (zero).

When the reference position HP is not aligned with the image forming position G0 in the main scanning direction, the main CPU 101 provides the control for shifting the image forming position G0 so that the image forming position G0 can be aligned with the reference position HP after compensating the deviation.

In the above description, however, it is supposed that the reference position HP is aligned with the center of the secondary transfer roller 18, but the present invention is not limited to the above embodiment, and the reference position HP may be set so that it is out of alignment from the center of the secondary transfer roller 18.

It should be appreciated that the above reference position HP may be provided as the default value that has previously been provided by the machine setting or the reference position HP that is previously provided as the initial value by the machine setting may be used. In either case, the machine setting is stored on the storage unit such as the nonvolatile flash memory, HDD and the like. The reference position HP can also be set, depending on the trend of the paper deviation.

Figure 4:
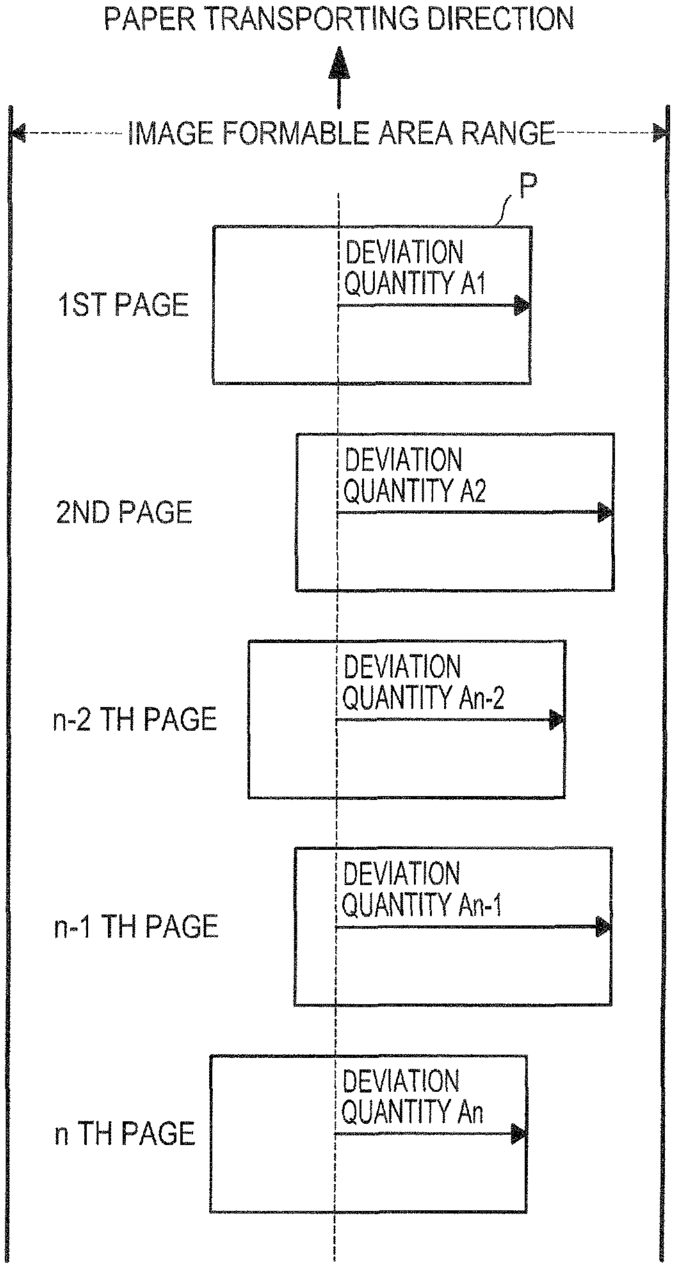
FIG. 4 is a diagram illustrating state of the deviation of the paper on the paper transport path in accordance with one embodiment of the present invention.

FIG. 4 illustrates how much the ends of a plurality of the papers are deviate with regard to the center of the secondary transfer roller 18 can be measured, how the quantities of those individual deviations can be averaged out, and how the reference position can then be set from the averaged deviation quantities.

Figure 5:
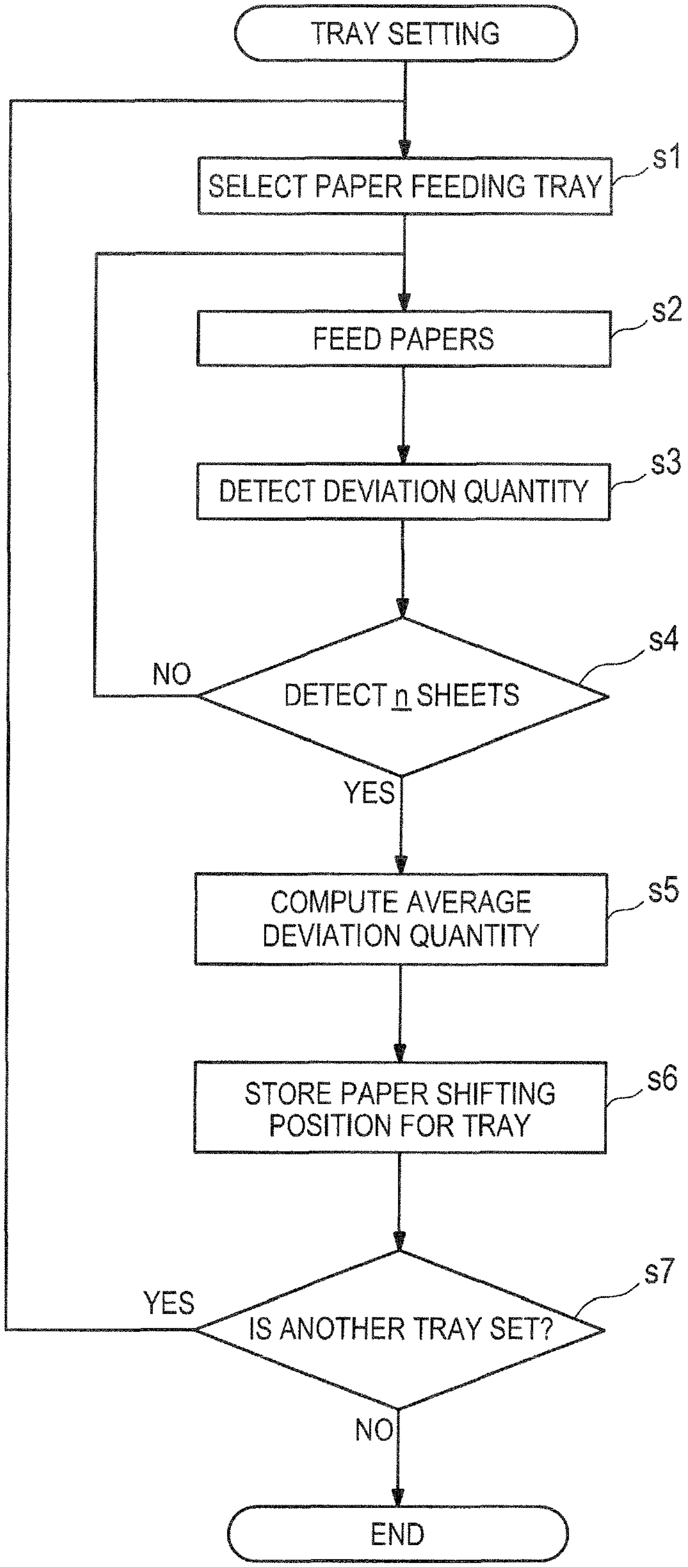
FIG. 5 is a flowchart diagram illustrating the procedure for deciding, for each paper feeding tray, the predetermined position of the paper when the deviation is compensated based on the trend of the deviation of the paper in accordance with one embodiment of the present invention.

The flowchart in FIG. 5 for setting the reference position based on the average of the individual deviation quantities is described below. In the following description, the steps in the flowchart are executed by the apparatus control unit 100.

Initially, an appropriate paper feeding tray is selected (Step s1). The selection of the paper feeding tray is made automatically or made by the operator on the operation unit 140.

Next, papers are fed from the selected paper feeding tray (Step s2). The paper position sensor 110 detects any deviation quantity of each paper (Step s3). Whether a count of the detected paper have been reached to n or not is then determined (Step s4). If the count does not reached to n (Step s4, NO), the procedure goes back to Step s2 where any deviation quantity of the paper is detected again (Step s3). If the count reaches to n (Step s4, YES), the procedure proceeds to the next following step (Step s5). It should be noted that the number of papers (such as n sheets) that has previously been set is stored in the storage unit 102. This number n of papers can be set by the operator on the operation unit 140 or changed by the operator.

After the n sheets of the paper have been detected, an average of the individual deviation quantities is computed from the individual deviation quantities as detected (Step s5). The position to which the paper is to be shifted and which concerns to the selected paper feeding tray is decided on the basis of the average deviation quantity that has been computed above, and is stored in the storage unit 102 (Step s6). The paper shifting position corresponds to the reference position. More specifically, on Step s5 and Step s6, the average deviation quantity is computed from the measured results of the deviation quantities of A1, A2, . . . , An−2, An−1, An, and the paper shifting position to which the paper should be located is decided from the relationship between the average deviation quantity and the paper size. Particularly, the paper position is not restricted to the paper shifting position that provides the basis for deciding the paper position, but it may be decided based on the paper center or the end of the paper in the main scanning direction.

Furthermore, it is determined whether the reference position should be set or not for selecting another paper feeding tray (Step s7). If the reference position is set for another paper feeding tray (Step s7, YES), the procedure goes back to Step s1 where it is repeated. If the reference position is not set for another paper feeding tray (Step s7, NO), the procedure is finished. For each paper feeding tray, the reference position can be set based on the average deviated quantities of the papers as described above. In this example, the deviation quantity is expressed in terms of the distance of the end position of the paper with regard to the center position, but the deviation quantity is not restricted to this. Rather, it may be expressed in terms of the difference between the end position of the paper that is centered and the end position as measured of the paper.

It is possible to set the reference position of the paper by obtaining the trend of deviation quantities when a plurality of the paper are fed. By this way, a reference position can be set according to the state of unique apparatus or the state of each paper feeding tray.

Multiple reference positions may be set for each paper feeding tray or each type of the paper.

Figure 6:
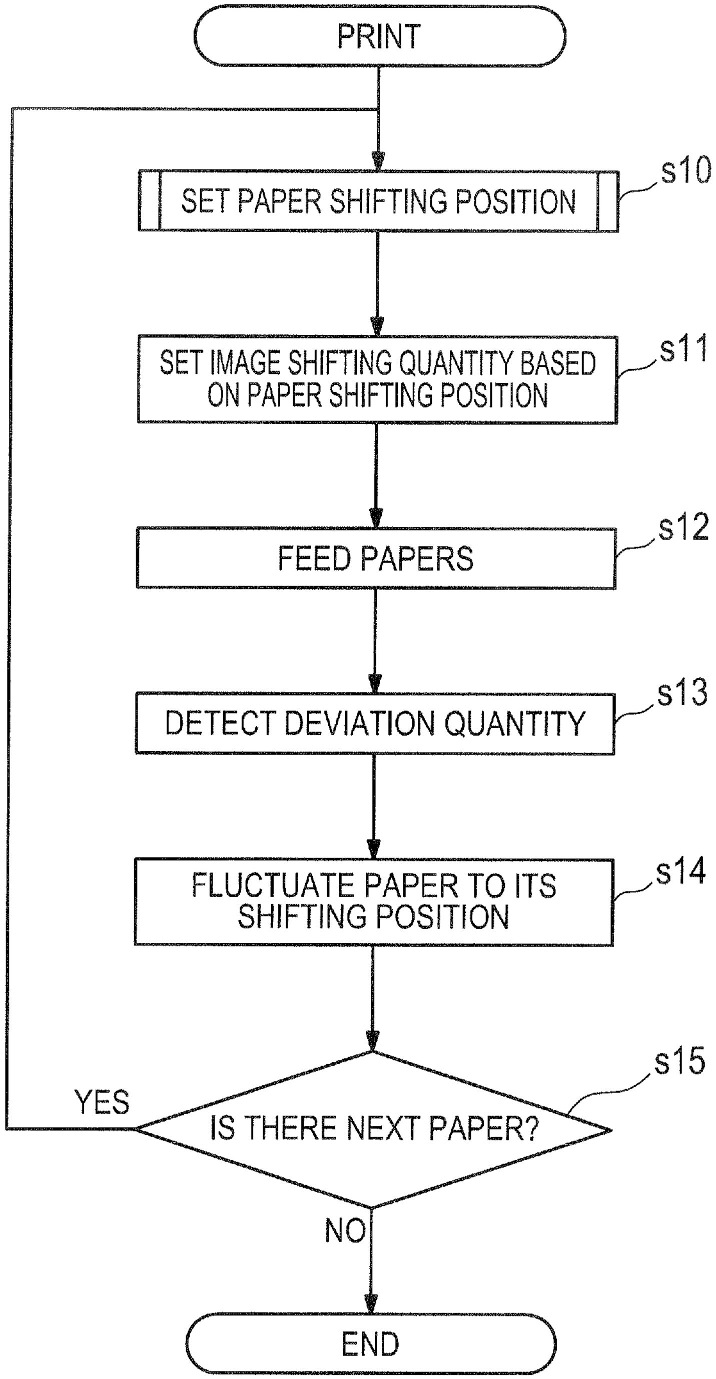
FIG. 6 is a flowchart diagram illustrating the procedure for compensating the deviation of the paper in accordance with the predetermined position of the paper when the deviation is compensated in accordance with one embodiment of the present invention.

Referring next to FIG. 6, the procedure for the deviation compensation based on the reference position is described in accordance with the flowchart shown in FIG. 6.

The paper shifting position is set (Step s10), the image position in which an image is to be formed by the image forming unit based on the paper shifting position that has been set in Step s10 is computed, and the quantity of the image shifting is set (Step s11). Papers are then fed from the paper feeding tray (Step s12), any deviation quantity that has been occurred for each paper is detected by the paper position sensor 110 (Step s13), the quantity of fluctuation required for the particular paper size is computed so that the paper can be fluctuated up to the paper shifting position by the resist rollers 23 (Step s14). It is determined whether or not there is any next following paper (Step s15). If it is determined that there is the next following paper (Step s15, YES), the procedure goes back to Step s10 where the paper shifting position is set and the procedure is repeated as described above. When the paper shifting position is to be set in accordance with the procedure shown in FIG. 5, the paper shifting position is decided using the deviation quantity for the immediately preceding paper plus the deviation quantities for the n sheets of the paper, and if it is determined that there is no next following paper (Step s15, NO), the procedure is finished.

Figure 7:
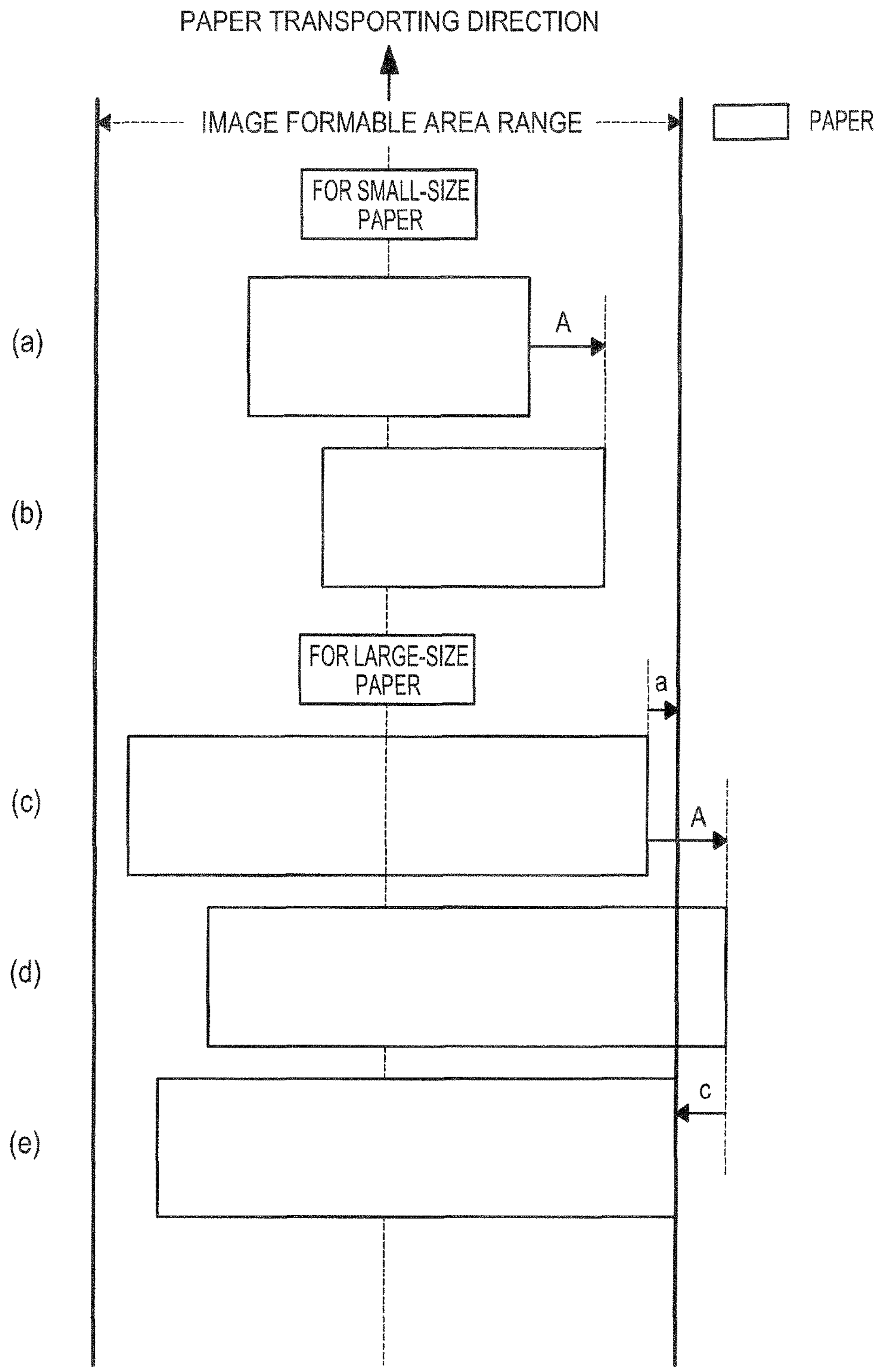
FIG. 7 illustrates state that the deviation of the paper being transported along the paper transport path causes the paper to go out of the range of the image formable area and the predetermined position of the paper is changed when the deviation is compensated in accordance with one embodiment of the present invention.

FIG. 7 shows the state in which the paper is deviated along on the paper transport path. (a) When the paper P has the small size, (b) the paper P will remain within the range of the image formable area in the image forming unit even though the paper P is fluctuated as far as the maximum possible fluctuations A can be provided by the resist rollers 23, and the image formation onto the paper P can thus be assured. (c) When the paper P has the large size and the distance a between the end of the main scanning direction for the paper P and the end of the range of the image formable area is only a <A, on the other hand, (d) it will be possible that the end of the paper P might go out of the range of the image formable area if the paper P is fluctuated indefinitely within the range of the maximum possible fluctuations A provided by the resist rollers 23. Since the image can only be formed onto the paper P within the range of the image formable area, the image will not be able to be formed onto the paper P in the portion that goes beyond the range of the image formable area. If the image is to be formed in that portion, the image would be printed onto the paper P with some parts of the image being lost.

In this case, if the shifting position of the image is decided so that the image area on the paper does not go out of the range of the image formable area, that is, the predetermined position of the paper is be decided to allow the deviation to be compensated, the image can be formed onto the paper P without causing any parts of the image to be lost. It is shown in FIG. 7 (*e*) that the image can be formed onto the paper P reliably by aligning the end of the paper with the end of the range of the image formable area, and no parts of the image will be lost.

By deciding the predetermined position so that the end of the paper can be aligned with the end of the range of the image formable area in the main scanning direction and thereby compensating any deviation of the paper, image can be formed reliably onto the paper.

Figure 8:
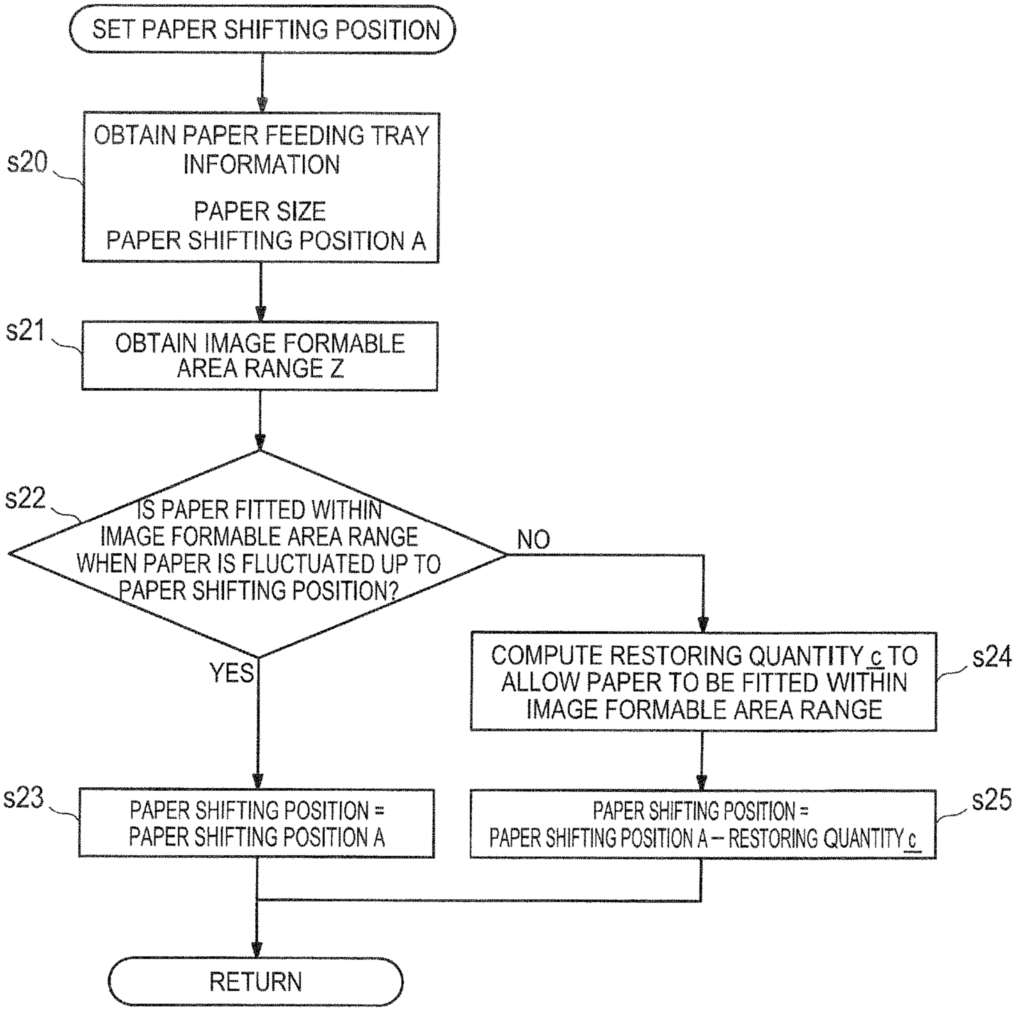
FIG. 8 is a flowchart diagram illustrating the procedure for deciding, for each paper feeding tray, the predetermined position of the paper according to the image area when the deviation is compensated in accordance with one embodiment of the present invention.

The procedure for setting the paper shifting position so that the paper can be fitted within the range of the image formable area is described in accordance with the flowchart shown in FIG. 8. The step in the flowchart is executed under the control of the apparatus control unit 100.

Initially, the information related to the paper feeding tray such as the paper size, the paper shifting position A and the like is obtained (Step s20), and the area of the image formable area Z is obtained. These information have been stored in the storage unit 102. The range of the image formable area Z has previously been set by the machine setting.

It is then determined whether or not the paper is fitted within the range of the image formable area when the paper is shifted to the paper shifting position A (Step s23). If it is determined that the paper is fitted within the range of the image formable area (Step s22, YES), the paper shifting position A that has previously been provided is decided as the paper shifting position (which corresponds to the predetermined position of the present invention) (Step s23), and the procedure is finished.

If it is determined that the paper will be fitted within the range of the image formable area as the result of the deviation compensation, the paper deviation compensation and the shifting of the image formation position is performed, depending on the reference position that has previously been set so that the image can be formed on the paper precisely.

If it is determined that the paper is not fitted within the image area (Step s22, NO), the restoring quantity c by which the paper should be restored so that the paper can be fitted within the range of the image formable area is computed (Step s24). This restoring quantity c is used to decide the paper shifting position that is a value computed from the expression of the paper shifting position A minus the restoring quantity c (step s25), and the procedure is finished.

When the deviation compensation is performed on the basis of the paper shifting position that has been decided above, the similar procedure that is represented by the flowchart shown in FIG. 6 is used to make the decision of the paper shifting position and the deviation compensation for each individual page.

In accordance with the embodiment of the present invention that has been described above, the predetermined position of the paper where the deviation compensation is performed can be decided, and the image can be formed by following the deviation compensation that was performed. Accordingly, the image can be formed precisely without the loss of any part of the image which is caused to the deviation compensation. It should be understood, however, that the above predetermined position of the paper is not restricted to whatever paper position should be used as the reference position, but the reference position may be the center or end of the paper in the main scanning direction, for example.

In accordance with embodiment of the present invention described above, it should be understood that when the image cannot be fitted within the range of the image formable area in the reference position that has previously been set and where the deviation compensation is performed, the different predetermined position other than the reference position may be decided and the deviation compensation of the paper can be made in that different predetermined position. In this way, the image can be formed on the paper in which the deviation has been compensated without causing any parts of the image to be lost. It is preferred, however, that the value for the reference position may be modified in order to meet with the predetermined position as decided above.

As described above, however, the predetermined position where the deviation is to be compensated can be decided on the basis of the image data for each page of the paper being actually printed, and it can be decided to meet the actual situation. In the embodiment described here, the predetermined position can be decided by permitting the image area described above to correspond to the maximum possible image area on which the image can be formed onto the paper.

When the image data for several pages is provided for use in forming the image on a single paper, the predetermined position where the deviation is compensated may be defined on the basis of the image data in the whole single sheet of the paper.

That is, the predetermined position where the deviation of the paper is compensated can be defined by considering the image data for several pages.

It has been described that it is determined whether or not the end of the paper can be fitted within the range of the image formable area, it may also be determined whether the image area can be fitted within the range of the image formable area or not.

By deciding the predetermined position where the deviation is compensated so that the end of the image area in the main scanning direction can be aligned with the end of the range of the image formable area in the main scanning direction, the image can be formed reliably onto the paper while the compensation quantities for deviation can be minimized. In this way, the load on making the deviation compensation can be reduced.

Figure 9:
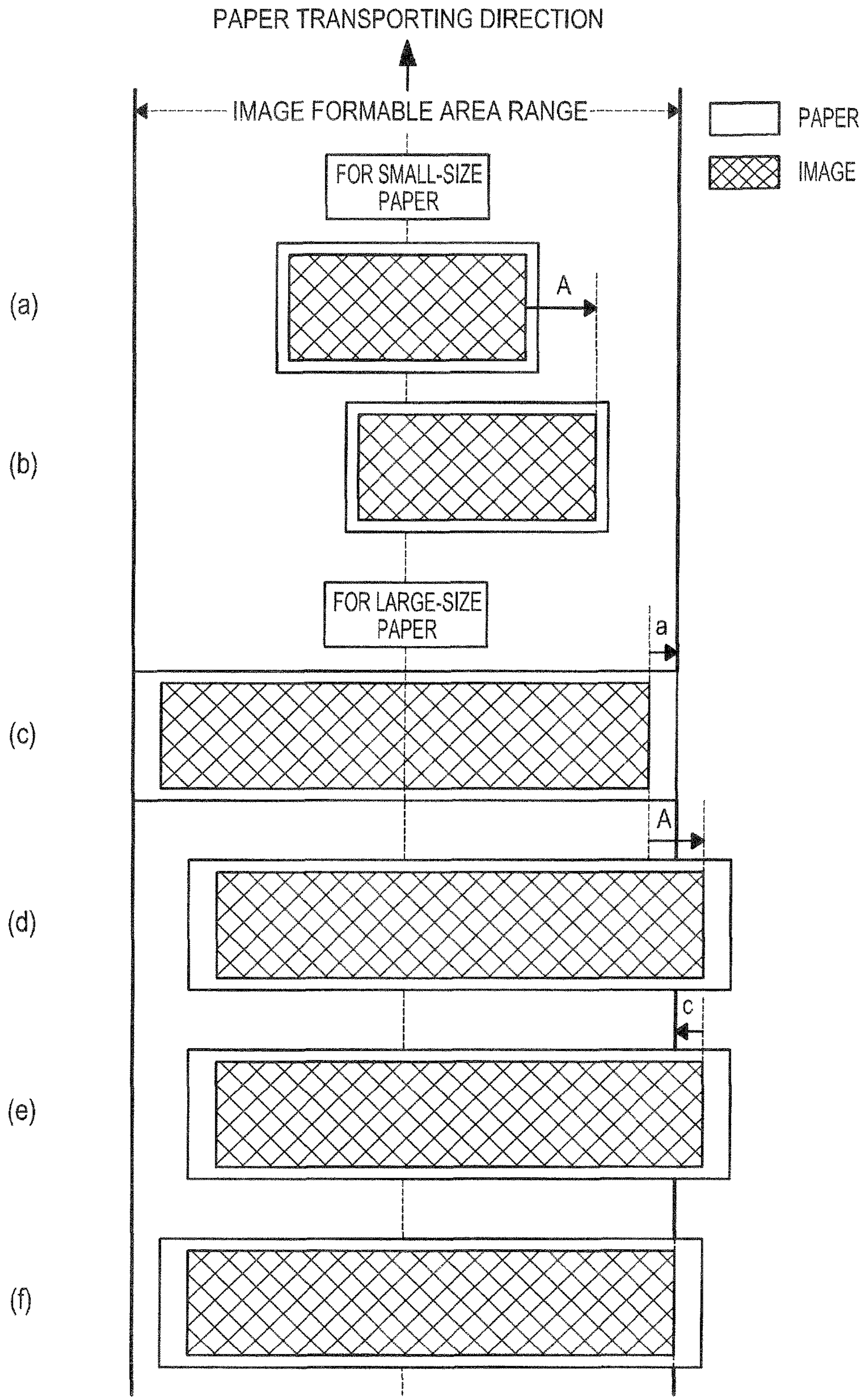
FIG. 9 illustrates state that the deviation of the paper being transported along the paper transport path causes the image area to go out of the range of the image formable area and the predetermined position of the paper is changing when the deviation is compensated in accordance with one embodiment of the present invention.

Referring next to FIG. 9, one example in which it is determined whether or not the image area can be fitted within the range of the image formable area is described below.

(a) For the small-size form P, (b) the image (image area) on the paper P is still located within the range of the image formable area in the image forming unit 10 even though the paper P is fluctuated by the resist rollers 23 as far as the maximum possible fluctuations A can be provided, and it is assured that the image is formed onto the paper P. (c) For the large-size form P, on the other hand, where the distance a between the image area of the paper P and the end of the range of the image formable area is only available, (d) it may be possible that the image area of the paper P goes out of the range of the image formable area if the paper P is fluctuated indefinitely within the range of the maximum possible fluctuations A ($a<A$). In this situation, the image can only be formed on the paper P within the range of the image formable area, and thus the image cannot be formed onto the paper P outside the range of the image formable area. If the image is to be formed onto the paper P outside the range of the image formable area, the image will be printed on the paper P with some parts of the image being lost.

In the above case, if the shifting position of the image is defined so that the image area on the paper P does not go out of the range of the image the formable area, that is, the predetermined position of the paper where the deviation compensation is carried out is defined. In this way, the image can be formed onto the paper P without the loss of any parts thereof. Then, as shown in FIG. 9 (*e*), the paper can be restored so that the end of the image can be aligned with the end of the range of the image formable area (FIG. 9 (*f*). That is, the deviation that should be compensated can be minimized by aligning the end of the image area with the end of the range of the image formable area, and the image can be formed reliably onto the paper P. Thus, the image formation onto the paper can be performed without the loss of any parts thereof. In this way, the load on the resist rollers 23 that carries out the fluctuations to be produced can be reduced to be as small as possible.

Figure 10:
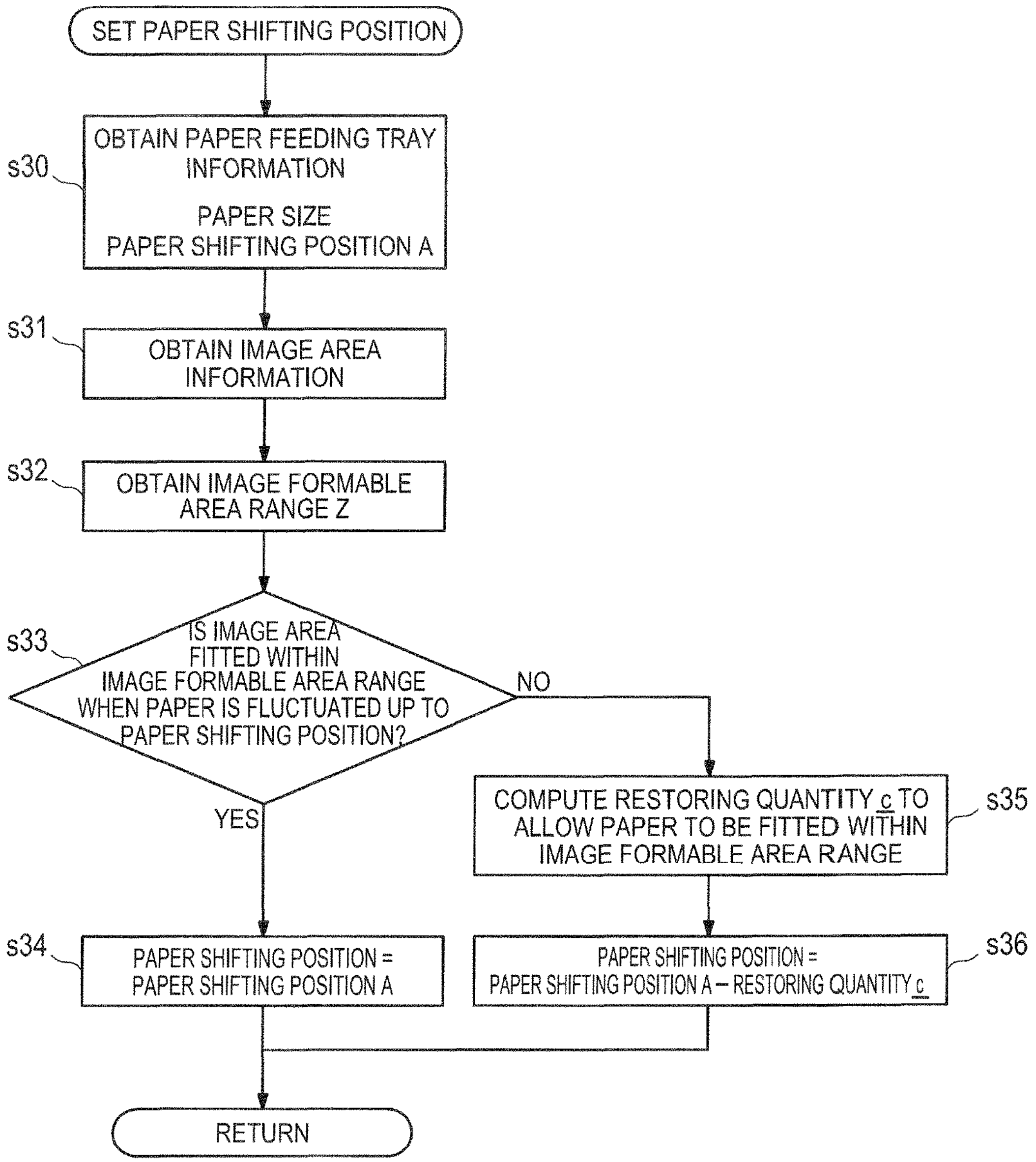
FIG. 10 is a flowchart diagram illustrating the procedure for deciding the predetermined position of the paper so that the image area is fitted within the range of the image formable area in accordance with one embodiment of the present invention.

The procedure of setting the paper shifting position in order to obtain the state shown in FIG. 9 (*f*) is described in accordance with the flowchart of FIG. 10. The step in the flowchart is executed by the apparatus control unit 100 under the control thereof.

Initially, the information related to the paper feeding tray such as the paper size, the paper shifting position and the like is obtained (Step s30), and the image area is obtained on the basis of the image data (Step s31). Then, the range of the image formable area Z is obtained (Step s32).

It is then determined whether or not the image area is fitted within the range of the image formable area when the paper is fluctuated up to the image shifting position A (Step s33). If it is determined that the image area is fitted within the range of the image formable area (Step s33, YES), the paper shifting position A that has previously been set is decided as the paper shifting position (which corresponds to the predetermined position of the present invention) (Step s34), and the procedure is finished.

If it is determined that the image area is not fitted within the range of the image formable area (Step s33, NO), the restoring quantity c for the paper is computed so that the image area can be fitted within the range of the image formable area (Step s35). The paper shifting position can be decided by using the above restoring quantity c, that is, the paper shifting position is changed by the value obtained by computing the expression of the paper shifting position A minus the restoring quantity c (Step s36), and the procedure is finished.

When the deviation compensation is based on the paper shifting position decided above, the procedure similar to the flowchart of FIG. 6 is used to make the paper shifting position decision and deviation compensation for each individual page.

It has been described above that the decision of the paper shifting position is made on the basis of the image area for each individual page and that the fluctuation of the paper may thus be varying dynamically for each individual page. In the following example, the paper shifting position is decided on the basis of the image area that is located on the outermost side for a plurality of pages, and the fluctuations will thus remain to be comparatively stable. The following description is provided by referring to the flowcharts of FIG. 11 and FIG. 12.

Initially, the paper shifting position (predetermined position) is decided on the basis of the image area located on the outermost side (Step s40). Firstly, the details of this procedure is provided by referring to FIG. 12.

The information related to the paper feeding tray such as the paper size, the paper shifting position A and the like is obtained (Step s50), and the image area is then obtained on the basis of the image data for all pages in the job (Step s51).

Furthermore, the end of the image area that is located on the outermost side among the image areas for all pages of the paper is extracted (Step s52). Then, the range of the image formable area Z is obtained (Step s53).

It is then determined whether or not the image area located on the outermost side is fitted within the range of the image formable area when the paper is fluctuated up to the paper shifting position A (Step s54). If it is determined that the image area located on the outermost side is fitted within the range of the image formable area (Step s54, YES), the paper shifting position A that has previously been set is decided as the paper shifting position (which corresponds to the predetermined position of the present invention) (Step s55), and the procedure is finished.

It is determined that the image area located on the outermost side is not fitted within the range of the image formable area (Step s54, NO), the restoring quantity c for the paper is computed so that the image area located on the outermost side can be fitted within the range of the image formable area (Step s56). This restoring quantity c is used to decide the paper shifting position that is value computed from the expression of the paper shifting position A minus the restoring quantity c (Step s 57).

Figure 11:
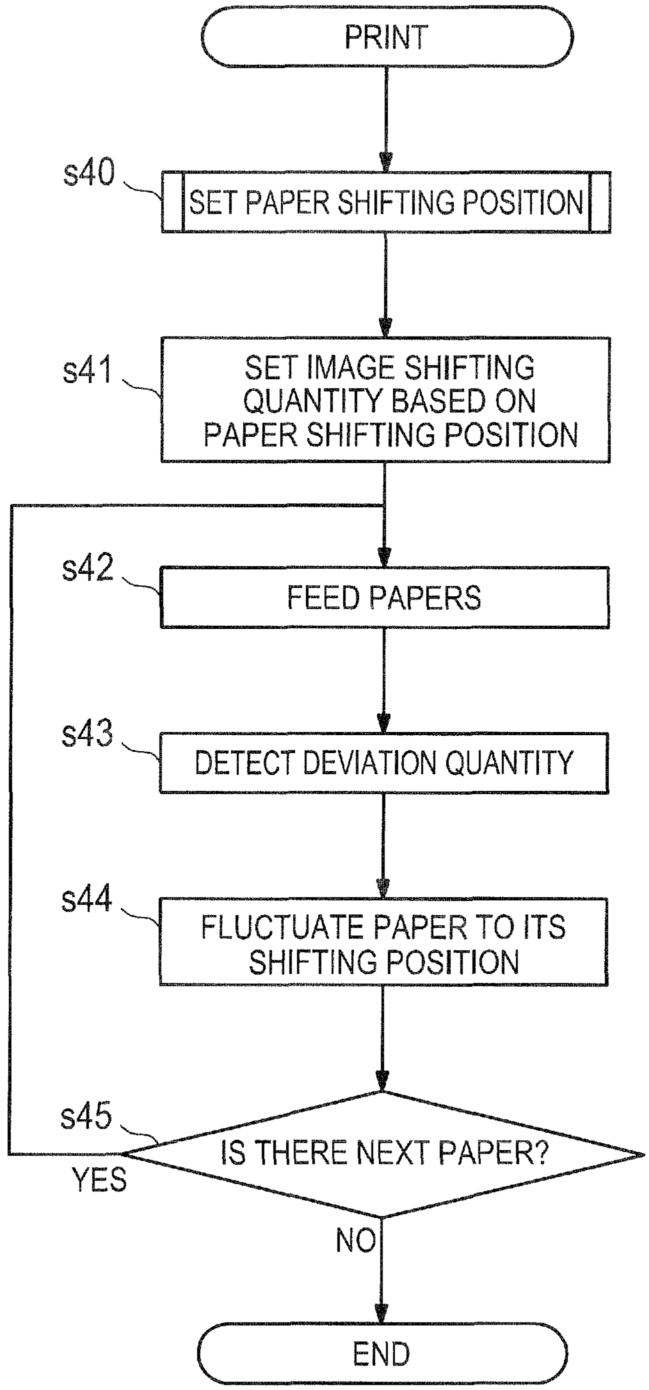
FIG. 11 is a flowchart diagram illustrating the procedure for compensating the deviation of the paper in accordance with the predetermined position of the paper that has been set for the total page of the paper when the deviation is compensated in accordance with one embodiment of the present invention.
Figure 12:
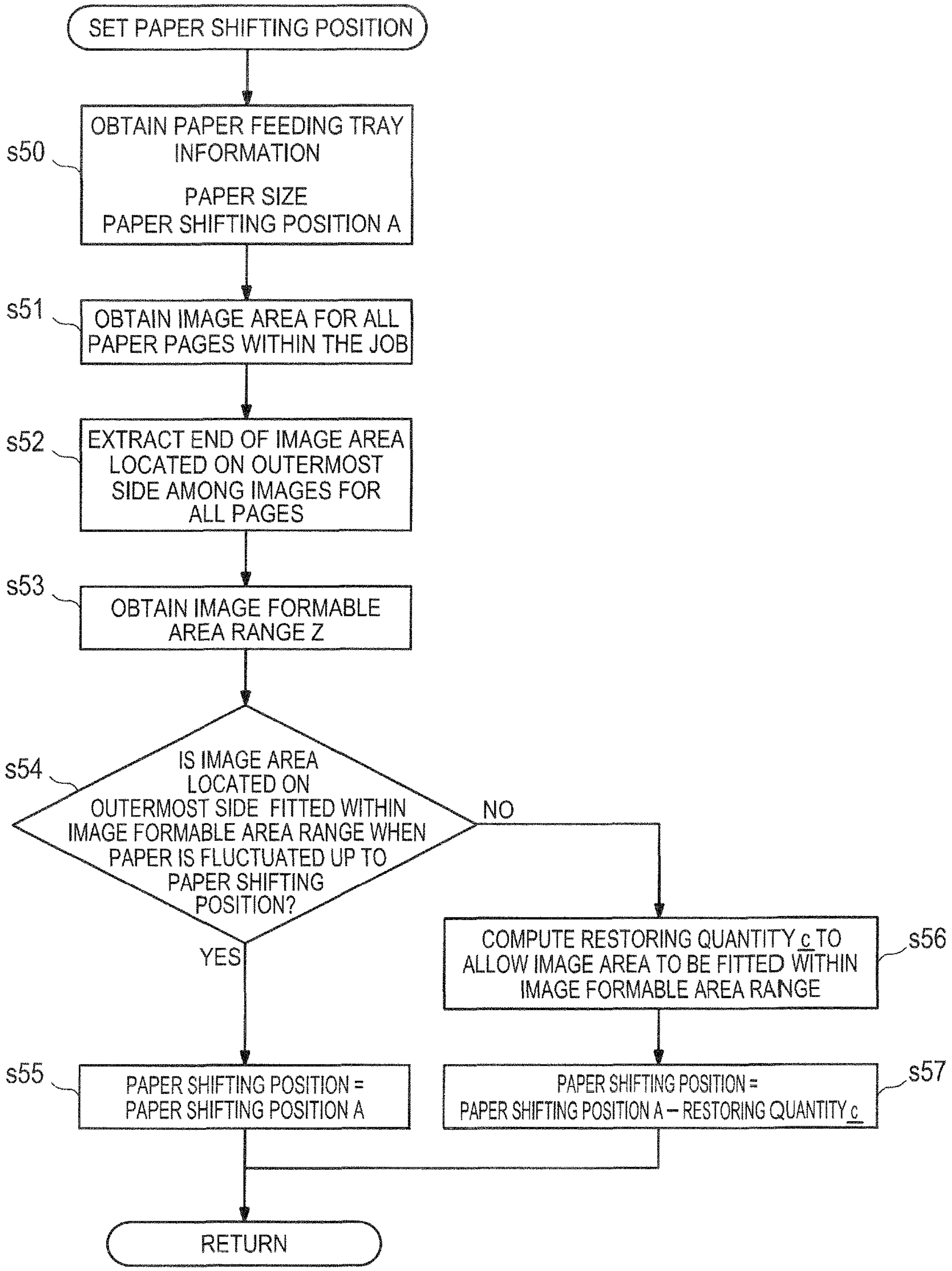
FIG. 12 is a flowchart diagram illustrating the procedure for deciding the predetermined position of the paper so that the image area located on the outermost side is fitted within the image formable area when the deviation is compensated in accordance with one embodiment of the present invention.

After the paper shifting position has been decided as described (Step s40), the image position where the image is to be formed is computed on the basis of the paper shifting position that has been set as shown in FIG. 11, and the quantity of the image shifting is set (Step s41). Paper are then fed from the paper feeding tray (Step s42), and detected the deviation quantities of the paper fed from the paper feeding tray by the paper position sensor 110, and the paper is fluctuated up to the paper shifting position by the resist rollers 23 in accordance with the fluctuations that have been computed from the relationship with the paper size (Step s44). It is then determined whether or not there is any next following paper (Step s45). If it is determined that there is the next following paper (Step s45, YES), the procedure goes back to Step s42 where additional papers are fed. The following steps of the procedure is then repeated. If it is determined that there is no next following paper (Step s45, NO), the procedure is finished.

In accordance with this procedure, the paper shifting position that has been decided on the basis of the image area located on the outermost side among a plurality of pages of the paper can be used for the plurality of pages.

In accordance with the embodiment described above, the predetermined position where the deviation compensation is carried out can be decided on the basis of the image data located on the outermost side, the deviation compensation can be performed by using the predetermined position that is common to all pages, and the image can thus be formed reliably onto the paper.

It may be appreciated from the foregoing description that the particular embodiment of the present invention described above allows the image to be formed precisely onto the paper, depending on the particular conditions such as the image size, the paper size and the like when any deviation compensation is performed.

In accordance with another embodiment, the predetermined position where the deviation compensation is performed can be provided so that the end of the image area can be aligned with the end of the range of the image formable area, wherein the deviation compensation can be minimized and the load on the image forming unit can be reduced.

Although the particular embodiment of the present invention has been described above, it should be understood that the present invention is not restricted to any information described in connection with the particular embodiment, but various modifications may be made without departing from the spirit and scope of the invention as defined in the appended claims.

DESCRIPTION OF REFERENCE NUMERALS

1 Image forming apparatus
10 Image forming unit
13 Writing unit
16 Intermediate transfer belt
18 Secondary transfer roller
19 Fixing device
21 Paper feeding tray
22 Paper transport path
23 Resist rollers
100 Apparatus control unit
101 Main CPU
102 Storage unit
110 Paper position sensor
140 Operation unit

What is claimed is:

1. An image forming apparatus comprising:

an image forming unit for forming an image on a paper in accordance with image data of a job;

a paper transport path for transporting the paper;

a paper position sensor for measuring a position of the paper being transported in a direction across a paper transporting direction;

a deviation compensating mechanism for compensating a deviation of the paper by shifting the paper, which is being transported, in the direction across the paper transporting direction in preparation for image forming; and a processor for controlling the image forming and the deviation compensation, wherein the processor performs a function of receiving results measured by the paper position sensor, shifting the paper toward a paper shifting position in the direction across the paper transporting direction, and shifting an image forming position in the image forming in a main scanning direction so as to be aligned with the paper shifting position of the paper in the deviation compensation, in accordance with the measured results, wherein a reference position of the deviation compensation of the paper is previously set;

wherein the processor determines a position of an image area in which the image is to be formed on the paper based on the image data for a given page of the job, the image area being defined by the image data for the given page;

wherein the processor determines whether the image area goes out of a range of an image formable area in the image forming unit, if the reference position is set as the paper shifting position and the image forming position is shifted to be aligned with the reference position which is set as the paper shifting position, by comparing the position of the image area which is defined by the image data for the given page with the reference position;

wherein the processor is capable of dynamically determining whether the image area goes out of the range of the image formable area in the image forming unit on a per page basis, in accordance with the image area which is defined by the image data for the given page; and wherein, (A) in a case in which it is determined that the image area goes out of the range of the image formable area if the reference position is set as the paper shifting position and the image forming position is shifted to be aligned with the reference position which is set as the paper shifting position, (B) the processor determines a new position as the paper shifting position which is different from the reference position, based on the image area and the range of the image formable area, wherein the new position is determined such that the image area does not go out of the range of the image formable area when the new position is set as the paper shifting position and the image forming position is set to be aligned with the new position which is set as the paper shifting position.

2. The image forming apparatus as defined in claim 1, wherein the reference position is provided by a machine setting.

3. The image forming apparatus as defined in claim 1, wherein the processor computes the reference position by taking an average of individual deviated quantities for each of a predetermined number of sheets of the paper that are obtained as measured by the paper position sensor.

4. The image forming apparatus as defined in claim 1, wherein the processor sets the reference position as the paper shifting position, in a case in which it is determined that the image area does not go out of the range of the image formable area if the reference position is set as the paper shifting position and the image forming position is shifted to be aligned with the reference position which is set as the paper shifting position.

5. The image forming apparatus as defined in claim 1, wherein the processor determines the new position as the paper shifting position such that an end of the image area in the main scanning direction is located at an end of the range of the image formable area in the main scanning direction when the paper is shifted to the new position which is set as the paper shifting position, in the case in which it is determined that the image area goes out of the range of the image formable area if the reference position is set as the paper shifting position and the image forming position is shifted to be aligned with the reference position which is set as the paper shifting position.

6. The image forming apparatus as defined in claim 1, wherein the processor determines, on the basis of the image data for each page of the paper being printed, whether or not the image area goes out of the range of the image formable area.

7. An image forming preparation method which is performed in preparation for image forming by an image forming unit in accordance with image data of a job, the method comprising:

measuring a position in a direction across a paper transporting direction of a paper being transported;

shifting the paper, which is being transported, toward a paper shifting position in the direction across the paper transporting direction to compensate a deviation of the paper, and shifting an image forming position for the image forming in a main scanning direction so as to be aligned with the paper shifting position of the paper, in accordance with results obtained by the measuring;

setting a reference position of the deviation compensation of the paper;

determining a position of an image area in which the image is to be formed on the paper based on the image data for a given page of the job, the image area being defined by the image data for the given page;

determining whether the image area goes out of a range of an image formable area in the image forming unit, if the reference position is set as the paper shifting position and the image forming position is shifted to be aligned with the reference position which is set as the paper shifting position, by comparing the position of the image area which is defined by the image data for the given page with the reference position, wherein whether the image area goes out of the range of the image formable area in the image forming unit can be dynamically determined on a per page basis, in accordance with the image area which is defined by the image data for the given page; and (A) in a case in which it is determined that the image area goes out of the range of the image formable area if the reference position is set as the paper shifting position and the image forming position is shifted to be aligned with the reference position which is set as the paper shifting position, (B) determining a new position as the paper shifting position which is different from the reference position, based on the image area and the range of the image formable area, wherein the new position is determined such that the image area does not go out of the range of the image formable area when the new position is set as the paper shifting position and the image forming position is set to be aligned with the new position which is set as the paper shifting position.

8. The image forming method as defined in claim 7, wherein the reference position is provided by a machine setting.

9. The image forming method as defined in claim 7, further comprising averaging deviation quantities for a plurality of pages of the paper as measured in the measuring of the paper position to thereby compute the reference position.

10. The image forming method as defined in claim 7, further comprising setting the reference position as the paper shifting position, in a case in which it is determined that the image area does not go out of the range of the image formable area if the reference position is set as the paper shifting position and the image forming position is shifted to be aligned with the reference position which is set as the paper shifting position.

11. The image forming method as defined in claim 7, further comprising determining the new position as the paper shifting position such that an end of the image area in the main scanning direction is located at an end of the range of the image formable area in the main scanning direction when the paper is shifted to the new position which is set as the paper shifting position, in a case in which it is determined that the image area goes out of the range of the image formable area if the reference position is set as the paper shifting position and the image forming position is shifted to be aligned with the reference position which is set as the paper shifting position.

12. The image forming method as defined in claim 7, further comprising determining, on the basis of the image data for each page of the paper being printed, whether or not the image area goes out of the range of the image formable area.

* * * * *